Oct. 24, 1950 W. F. WILSON 2,526,919
TRANSMISSION
Filed Nov. 6, 1943 2 Sheets-Sheet 1

Inventor
W. F. Wilson
by W. Zierold
Attorney

Oct. 24, 1950 W. F. WILSON 2,526,919
TRANSMISSION
Filed Nov. 6, 1943 2 Sheets-Sheet 2

Inventor
W. F. Wilson
by W. Bierol?
Attorney

Patented Oct. 24, 1950

2,526,919

UNITED STATES PATENT OFFICE 2,526,919

TRANSMISSION

William F. Wilson, Wauwatosa, Wis., assignor to Allis-Chalmers Manufacturing Company, Milwaukee, Wis., a corporation of Delaware Application November 6, 1943, Serial No. 509,194

16 Claims. (Cl. 74—333)

The invention relates to variable speed gearing and it is concerned more specifically with a change speed transmission for special requirements, such as are encountered, for instance, in motor vehicles which are equipped with a hydraulic torque converter and which are intended for operation at widely different speeds.

In tractors, particularly those for military purposes, which must be capable of operation not only at relatively low speeds forward and reverse, but also at a relatively high speed where conditions permit, the widely different speeds cannot be obtained with a satisfactory degree of efficiency by a torque converter alone. If a torque converter is to be used it is preferably supplemented by an automotive type of transmission which is suitably designed to afford the desired speeds at a satisfactory degree of efficiency of the torque converter, say a low forward speed up to about nine miles per hour, a creeper speed for extremely slow forward travel up to about seven miles per hour, a high forward speed up to about thirty-five miles per hour, and a low reverse speed up to about eight miles per hour. In vehicles of the mentioned type it is further desirable to provide an overrunning clutch in the low speed gearing so that it is only necessary to interrupt the high speed drive in order to establish the low speed drive. The requirement of a high traveling speed which is much higher than the low speeds, and the requirement of providing an overrunning clutch entail a number of difficulties in the construction of such a supplemental transmission.

For instance, if the overrunning clutch is of the usual roller type, the low speed drive must be so arranged that the rollers do not become subject to excessive circumferential velocities and corresponding centrifugal forces which would result in undue friction losses, when power is transmitted through the high speed drive and the driven shaft of the transmission rotates at a relatively high speed. Further, a reverse drive affording a suitably low speed must be provided, and the gearing of the reverse drive must not become subject to excessive velocities and corresponding friction losses when power is transmitted through the high speed drive. When descending a hill it is desirable to utilize the braking power of the engine, and for that purpose the overrunning clutch must be locked.

Generally, it is an object of the invention to provide a transmission which meets all of the afore-mentioned requirements.

More specifically, it is an object of the invention to provide an improved transmission affording a high speed drive, a low speed drive, a creeper speed drive which is lower than the low speed drive, and a low reverse speed drive, and in which the driving connections between the driving and driven shafts are so arranged that the transmission requires only a relatively small number of gears, and shafts of relatively short length, short shafts being desirable from a performance standpoint as well as for manufacturing reasons, as is well-known in the art.

A further object of the invention is to provide a transmission of the mentioned character in which the several speed changes may be effected by a simple shift mechanism which may conveniently be operated without liability of confusion.

The creeper speed is preferably obtained, according to the invention, by means of two shiftable gears on the driving and driven shafts, respectively, the gear on the driven shaft being a selector gear adjustable to three predetermined positions, and the driving gear on the driving shaft being movable into and out of mesh with the selector gear while the latter is in one of its predetermined positions.

The low speed is preferably obtained, according to the invention, by means of a pair of permanently meshing gears coaxial, respectively, with the driving and driven shafts, the driving gear of this pair being fixed on the driving shaft and the driven gear being connectable with and disconnectable from the driven shaft by shifting movement of the selector gear. An overrunning clutch comprises a cam member fixed to the driven gear, a race member and rollers, and the race member has clutch teeth engageable with clutch teeth on the selector gear.

The high speed is preferably obtained, according to the invention, by another pair of permanently meshing gears coaxial, respectively, with the driving and driven shafts, the driving gear of this pair being fixed on the driving shaft and the driven gear being connectable with and disconnectable from the driven shaft by means of a clutch collar shiftable axially of the driven shaft. The clutch collar also serves to lock the overrunning clutch upon interruption of the high speed drive, so that the braking power of the engine may be used when the tractor is descending a hill in low gear. When the tractor is driven at high speed upon establishment of the high speed drive the cam member of the overrunning clutch is not subject to the high speed of the driven shaft, and no high circumferential velocities are, therefore, transmitted to the rollers which would subject the rollers to high centrifugal forces and cause undue friction losses.

The reverse speed is preferably obtained, according to the invention, by means of a reverse idler in constant mesh with the driving gear of the low speed gearing, the reverse idler having a gear section adapted to mesh with the selector gear upon movement of the latter longitudinally of the driven shaft. This arrangement provides a suitably low speed for the reverse drive and does not subject the reverse idler to an excessive circumferential velocity when the tractor is driven at high speed upon establishment of the high speed drive.

The foregoing and other objects and advantages of the invention will be more fully apparent from the following description of a preferred embodiment of the invention shown in the accompanying drawings. Referring to the drawings, in which like reference characters designate the same or similar parts in the various views:

Driving and driven shafts of the transmission are designated by the reference characters 1 and 2, respectively, these shafts being mounted in a housing 3 for rotation about relatively spaced parallel axes. The driving shaft 1 is supported in ball bearings 4 and 6 and has a splined rearward end 7 for connection to the tail shaft of a hydraulic torque converter not shown. The driven shaft 2 is supported in double ball bearings 8 and 9 and has a spiral bevel pinion 11 at its forward end adapted to mesh with a spiral ring gear of a differential mechanism, not shown, it being understood that the transmission is for use in a tractor having a rearwardly located engine, a hydraulic torque converter between the engine and the transmission, and forwardly located propelling gearing including the mentioned differential mechanism.

The driving shaft 1 has a circumferential series of longitudinally extending splines 12 on the portion thereof between the ball bearings 4 and 6, and a circumferential groove 13 is cut into the splines 12 about midway between the bearings 4 and 6. A driving gear 14 coaxial with the driving shaft 1 is non-rotatably connected with said shaft for adjustment longitudinally thereof in the space between the groove 13 and the ball bearing 4, the gear 14 having an internally splined hub matching the splines 12.

Two gears 16 and 17 coaxial with the driving shaft 1 are non-rotatably secured in axially fixed positions on the splined portion of said shaft which extends between the groove 13 and the bearing 6, these gears having internally splined hubs matching the splines 12 and being held against axial displacement by two half-rings 18 seated in the groove 13 and in a recess of the gear 16; by a spacer 19 between the gears 16 and 17; and by a thrust washer 21 abutting the inner race of the bearing 6.

The driven shaft 2 has a circumferential series of longitudinally extending splines 22 on the portion thereof between the bearings 8 and 9, and four circumferential grooves 23, 24, 26, and 27 are cut into the splines 22. A snap ring 28 within the groove 23 serves as an abutment for the inner race of the roller bearing 8, and the purposes of the other grooves will appear hereinbelow.

Figure 1:
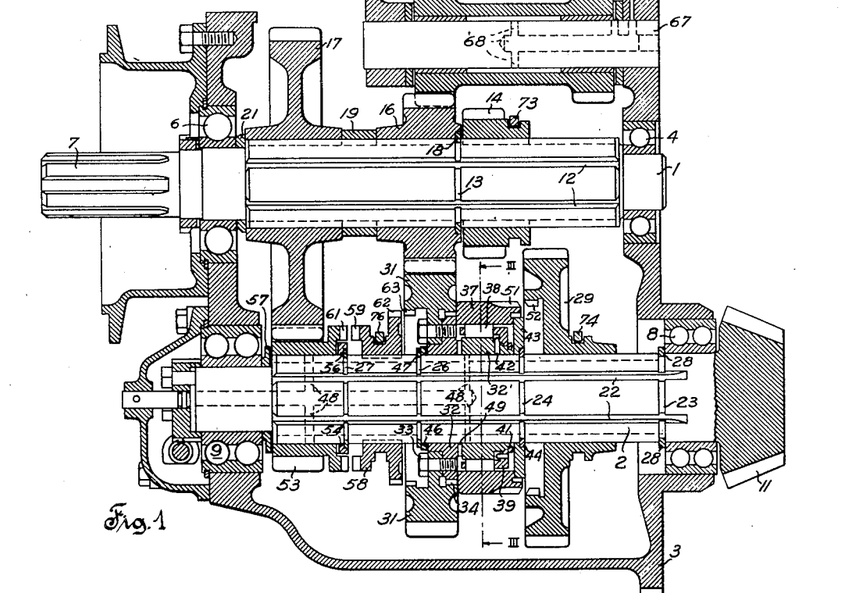
Fig. 1 is a sectional top view of a transmission, along line I—I of Fig. 2.

A selector gear 29 coaxial with the driven shaft 2 is non-rotatably connected with said shaft for adjustment longitudinally thereof in the space between the grooves 23 and 24, the selector gear having an internally splined hub matching the splines 22. Gear teeth on a pitch circle of relatively large diameter are formed at the periphery of the selector gear. The driving gear 14 may be meshed with the selector gear 29, while the latter is in the position axially of the shaft 2 in which it is shown in Fig. 1, by forward movement of the driving gear 14 from the position shown in Fig. 1. It will be noted that the pitch diameter of the gear 14 is much smaller than the pitch diameter of the selector gear, and the proportioning of the gears 14 and 29 is such as to afford the mentioned creeper speed. Movement of the gear 14 into mesh with the gear 29 while the latter is in the position in which it is shown in Fig. 1, establishes the creeper speed drive. The position of the gear 29 axially of the shaft 2, in which said gear is shown in Fig. 1, will be referred to hereinbelow as a first position of the selector gear and, correspondingly, the position occupied by the gear 14 when it is in mesh with the selector gear while the latter is in its first position, will be referred to as a first position of the drive gear. The position of the drive gear 14 axially of the shaft 1, in which it is shown in Fig. 1, will be referred to hereinbelow as a second position of the drive gear.

A low speed gear coaxial with the driven shaft 2 and in constant mesh with the gear 16 on the driving shaft comprises a ring gear 31 and a hub portion 32 which are rigidly secured together by a circumferential series of bolts 33 and mortises 34. Gear teeth at the periphery of the ring gear 31 are formed on a pitch circle of smaller diameter than the pitch diameter of the selector gear 29. The hub portion 32 has a cylindrical axial bore affording a smooth bearing surface for cooperation with the cylindrical outer surface portions of the splines 22 between the grooves 24 and 26, the rotary mounting of the hub portion 32 on the shaft 2 permitting free rotation of the driven shaft relative to the hub portion 32 and, accordingly, free rotation of the driven shaft 2 relative to the ring gear 31 which is permanently meshed with the gear 16 on the driving shaft 1.

Figures 2, 4:
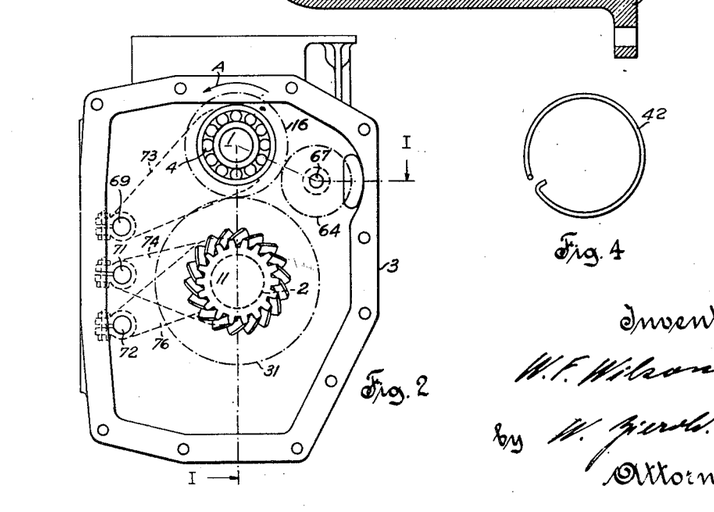
Fig. 2 is an end view, at a reduced scale, of the transmission shown in Fig. 1.
Fig. 4 is a detail view of a spring ring forming part of an overrunning clutch shown in Figs. 1 and 3.
Figures 3, 5, 6, 7:
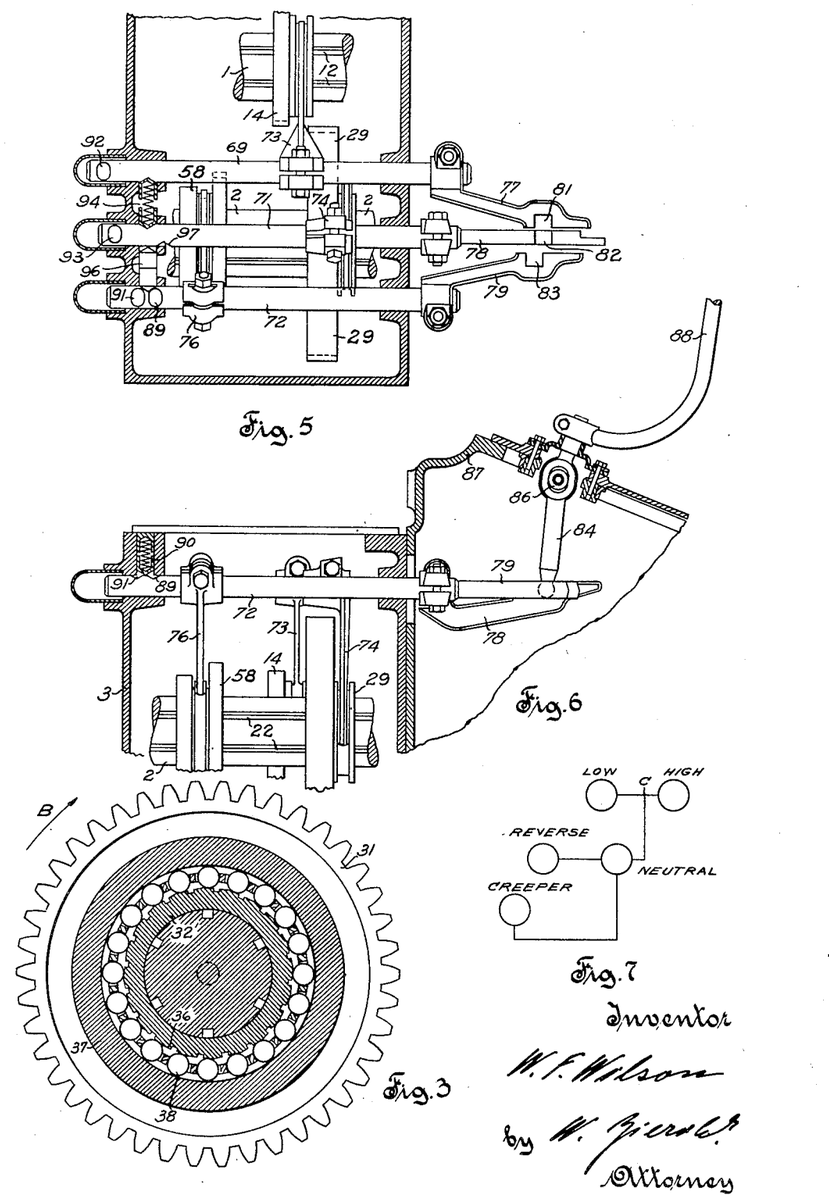
Fig. 3 is a sectional view, at an enlarged scale, on line III—III of Fig. 1.
Fig. 5 is a top view of a shift mechanism for the transmission shown in Fig. 1.
Fig. 6 is a side view of the shift mechanism shown in Fig. 5.
Fig. 7 is a shift diagram for the mechanism shown in Figs. 5 and 6.

Integrally formed with the hub portion 32 at the side of the ring gear 31 facing the selector gear 29 is a cam member 32', which has a circumferential series of flats 36 as shown in Fig. 3. The cam member 32' is surrounded by a race member 37, and a series of rollers 38 cooperate with the cam member 32' and the race member 37 to provide a one-way driving connection between the ring gear 31 and the race member 37. An annular cage 39 for the rollers 38 is mounted on an axial extension of the cam member 32' for limited rotary displacement relative thereto, and a snap ring 41 is placed into a groove of the cam extension to secure the cage 39 against axial displacement in a forward direction towards the selector gear 29. Axial displacement of the cage in the opposite direction is limited by a suitable shoulder on the cam extension. A spring ring 42, shown separately in Fig. 4, surrounds the cam extension inside the cage 39, the ring 42 having a radial end portion seated in a radial bore of the cam extension, and an axial end portion seated in an axial bore of the cage 39. The spring ring 42 is initially tensioned and tends to rotate the cage 39 in anticlockwise direction, as viewed in Fig. 3, relative to the cam member 32'. Rotary movement of the cage relative to the cam member in anticlockwise direction, as viewed in Fig. 3, under the torsional spring action of the ring 42 causes the cage bars to contact the rollers 38 and to urge the rollers along the flats 36 into contact with the inner cylindrical surface of the race member 37, the cage having sufficient rotary play relative to the cam member so as not to impede movement of the rollers into contact with the race member on the one hand, and so as to permit clockwise movement of the cage, on the other hand, against the torsional spring action of the ring 42 when the race member overruns the cam member in clockwise direction, which will occur when the high speed drive is established, as explained hereinbelow.

A circular thrust plate 43 extends radially of the shaft 2 at the front end of the cam extension facing the selector gear 29, the thrust plate having a splined central opening matching the splines 22, the two half-rings 44 are seated in the groove 24 of the shaft 2 and in a circular recess of the plate 43. The race member 37 has an annular recess at the side facing the selector gear 29, and a peripheral portion of the plate 43 projects into said annular recess of the race member 37 to prevent axial displacement of the race member in a forward direction. Axial displacement of the race member 37 in a rearward direction is limited by contact of the race member with a flange of the hub portion 32, the spacing between the flange and the plate 43 being such as to permit rotation of the race member relative to the flange and plate without appreciable axial play. The plate 43 has no direct driving connection with the race member 37. Axial displacement of the hub portion 32, cam member 32' and ring gear 31 relative to the shaft 2 is limited, in a forward direction, by contact of the cam extension with the plate 43 and in a rearward direction, by contact of the hub portion 32 with a thrust washer 46 which is splined to the shaft 2 and abuts against a spring ring 47 seated in the groove 26.

The shaft 2 has axial and radial bores 48 through which lubricant under pressure may pass to the bearing surfaces between the hub portion 32 and the splines 22, and the hub portion 32 has a number of radial bores 49 to permit passage of lubricant into the space between the cam member 32' and race member 37 where the rollers 38 are located.

A circumferential series of axially extending grooves are cut into a peripheral portion of the race member 37 to form clutch teeth 51 thereon, and the selector gear 29 is recessed at the side facing the race member and has an annular series of clutch teeth 52 adapted to drivingly engage the clutch teeth 51 upon axial movement of the selector gear to the rear from the position in which it is shown in Fig. 1.

In order to establish the low speed drive the driving gear 14 is moved into its second position in which it is shown in Fig. 1, and the selector gear 29 is moved from its first position in which it is shown in Fig. 1, into clutching engagement with the race member 37. The position occupied by the selector gear when it is clutched to the race member 37 will be referred to hereinbelow as a second position of the selector. It will be noted that the drive gear 14 and the selector gear 29 are movable from first predetermined positions thereof, in which they are in mesh with each other, in one direction to second predetermined positions, and that the spacing between the first and second positions of the drive gear 14 is greater than the spacing between the first and second positions of the selector gear 29 so that said gears, when adjusted to their second positions, are out of mesh with each other.

Assuming that the drive gear 14 and the selector gear 29 have been adjusted to their second positions, and that the driving shaft 1 is rotating in the direction of arrow A in Fig. 2, the ring gear 31, hub portion 32, and cam member 32' are then rotated in the direction of arrow B in Fig. 3. The rollers 38 being wedged between the cam member 32' and the race member 37 by the torsional spring action of the ring 42, cause the race member 37 to rotate in unison with the ring and hub portions 31, 32, and since the race member 37 is locked to the selector 29 through the clutch teeth 51, 52, and the selector gear 29 is splined to the driven shaft 2, the latter is rotated in the direction of arrow B shown in Fig. 3. The pitch diameter of the gear 16 is smaller than the pitch diameter of ring gear 31, and upon establishment of the low speed drive the driven shaft 2 is rotated at a speed lower than the speed of rotation of the driving shaft 1.

A high speed gear 53 in constant mesh with the gear 17 on the driving shaft is mounted coaxially with the driven shaft 2 for rotation relative thereto, the gear 53 having a cylindrical axial bore affording a smooth bearing surface for cooperation with the outer cylindrical surface portions of the splines 22 between the groove 27 and the bearing 9. The gear 53 is retained in an axially fixed position by two half rings 54 splined to the driven shaft and abutting a snap ring 56 placed into the groove 27, and by a thrust washer 57 interposed between the hub of the gear 53 and the inner race of the bearing 9. Radial branches of the oil passage 48 permit admission of lubricant under pressure to the running surface of the gear 53 in contact with the shaft 2.

A clutch collar 58 coaxial with the driven shaft is non-rotatably connected with said shaft for adjustment longitudinally thereof between the gear 53 and the ring gear 31, the clutch collar having internal splines matching the splines 22. A circular series of clutch teeth 59 are formed at the side of the clutch collar facing the gear 53, and a corresponding series of clutch teeth 61 are formed at the side of the gear 53 facing the clutch collar, the teeth 59 being movable into driving engagement with the teeth 61 by rearward movement of the clutch collar from the position in which it is shown in Fig. 1. It will be noted that the end section of the collar 58 on which the clutch teeth 59 are formed, and the hub part of the gear 53 on which the clutch teeth 61 are formed represent an axially shiftable and an axially fixed torque transmitting member, respectively, of a first clutch which is mounted on one of the transmission intake and output shafts, such one shaft in the illustrated embodiment of the invention being the output shaft 2. The hub part of the gear 29 which, as stated, has a circumferential series of internal clutch teeth 52, represents an axially shiftable member of a second clutch, and this second axially shiftable clutch member is connected independently of the axially shiftable clutch member of the first clutch, in nonrotatable relation with the output shaft and is operable to establish and interrupt a driving connection between the driven member 37 of the overrunning clutch and the output shaft 2.

A peripheral series of clutch teeth 62, are formed on the end of the clutch collar 58 facing the ring gear 31, and a corresponding series of clutch teeth 63 are formed along the edge of a recessed portion of the ring gear 31. Movement of the clutch collar 58 forwardly from the position in which it is shown in Fig. 1, establishes a locking connection between the ring gear 31 and the driven shaft 2 by engagement of the clutch teeth 62 with the clutch teeth 63.

The end section of the clutch collar 58 on which the circumferential series of clutch teeth 62 are formed, and the hub part of the gear 31 on which the circumferential series of clutch teeth 63 are formed, represent an axially shiftable and axially fixed member of a lock-up clutch, and these axially shiftable and axially fixed members of the lock-up clutch are connected, respectively, with the axially shiftable torque transmitting member of the mentioned first clutch and with the driving member 32' of the overrunning clutch.

The high speed drive is established by first moving the selector gear 29 from its first into its second position, that is into clutching engagement with the race member 37, and by then moving the clutch collar 58 into clutching engagement with the gear 53. The clutching engagement of the selector gear 29 with the race member 37 is only a preparatory step for purposes which will appear hereinbelow, it being apparent that upon engagement of the clutch collar 58 with the gear 53 the entire driving power is transmitted from the shaft 1 to the shaft 2 through the gears 17, 53 and clutch collar 58, and that the selector gear 29 and race member 37 rotate idly in unison with the driven shaft after the gear 53 has been locked with the driven shaft by the clutch collar 58. It will be noted that the pitch diameter of the gear 53 is not only smaller than the pitch diameter of the ring gear 31, but also considerably smaller than the pitch diameter of the gear 17. In other words, the establishment of the high speed drive through the gears 17, 53 and clutch collar 58 affords a speed of rotation of the driven shaft 2 which is higher than that of the driving shaft, as distinguished from the low speed drive through the gears 16, 31 which affords a speed of rotation of the driven shaft 2 lower than that of the driving shaft, as has been pointed out hereinbefore.

When the driven shaft 2 is rotated at a high speed, say 2000 R. P. M., upon establishment of the high speed drive, the race member 37, being connected with the driven shaft through the selector gear, overruns the cam member 32' which rotates at a much lower speed, say 650 R. P. M., depending on the gear ratios of the high speed gearing 17, 53 and of the low speed gearing 16, 31. The driven shaft 2 being rotatable relative to the hub member 32 and cam member 32', as has been pointed out hereinbefore, also overruns the cam member 32' when the driven shaft is driven at the mentioned high speed, and while the relative speed between the cam member and the race member is fairly high, namely 1350 R. P. M. under the assumed conditions, the circumferential velocity transmitted to the rollers 38 by the cage 39 is relatively low, that is 650 R. P. M. under the assumed conditions. In other words, the rollers 38 are not subject to a high circumferential velocity and to correspondingly high centrifugal forces which would cause undue friction losses, when the driven shaft 2 is rotated at a high speed through the gearing 17, 53.

Considering now the low speed drive, it will be noted that the mentioned clutching engagement of the selector gear 29 with the race member 37 places the low speed driving connection in condition to transmit forward driving power to the shaft 2 from the shaft 1 immediately upon disengagement of the clutch teeth 59 from the clutch teeth 61. That is, when the driving connection between the clutch teeth 59, 61 is broken the driving resistance of the vehicle causes the driven shaft 2 to decelerate, and as soon as the speed of the driven shaft 2 tends to fall below the speed of the gear 31 the driving power of shaft 1 will automatically become effective to rotate the shaft 2, the power flow then being from gear 16 through gear 31, hub 32, cam member 32', rollers 38, race member 37, clutch teeth 51, 52 to hub of selector gear 29 which is splined to the shaft 2. The transmission herein disclosed, therefore, lends itself particularly for use in tractors and similar heavily loaded vehicles, where the driving resistance would cause the driven shaft 2 to decelerate rapidly upon disengagement of the clutch teeth 59 from the clutch teeth 61.

In order to make the braking power of the engine available for retarding the vehicle when it is descending a hill upon establishment of the low speed drive, it is necessary to prevent the driven shaft 2 from overrunning the gear 31. This is accomplished by moving the clutch collar 58 to its extreme forward position in which the clutch teeth 62 are fully engaged with the clutch teeth 63, or in other words, by establishing a locking connection between the shaft 2 and the gear 31, which causes the cam member 32' to become locked with the shaft 2. The clutch teeth 62, 63 are beveled at their relatively adjacent ends, in conformity with conventional practice, so that the clutch teeth 62 may override the clutch teeth 63 when the clutch collar 58 is moved forwardly into contact with the gear 31 while the latter rotates at a lower speed than the clutch collar 58. When the rollers 38 become wedged between the cam member 32' and the race member 37 by the driving torque acting upon the gear 31, the clutch collar 58 may not be in the correct position relative to the gear 31 to permit entry of the clutch teeth 62 into the gaps between the clutch teeth 63. However, by decelerating the engine momentarily after the vehicle has been accelerated the driven shaft 2 may be caused to overrun the gear 31 sufficiently to permit full driving engagement of the clutch teeth 62 with the clutch teeth 63 by axial forward movement of the clutch collar 58; and before the engine is accelerated again the gear 31 will then be driven from the shaft 2 through the clutch teeth 62, 63.

While it is usual in jaw clutches to provide for a relatively close fit of one set of teeth within the gaps of the other in order to keep the backlash down, the clutch teeth 62 in the present instance are appreciably narrower, circumferentially, than the gaps between the clutch teeth 63, the purpose being to afford sufficient backlash between the clutch collar 58 and the gear 31, which will be effective to relieve the clutch teeth 62, 63 from all, or substantially all driving strains when forward driving power is transmitted to the shaft 2 from the shaft 1 through the gears 16, 31, cam member 32', rollers 38, race member 37, and hub of selector gear 29.

A reverse idler comprising gear wheels 64 and 66 is mounted near the bottom of the housing 3 for rotation about an axis spaced from and extending parallel to the axes of the driving and driven shafts 1 and 2, the reverse idler being rotatably mounted on a stationary shaft 67 which has oil passages 68 for the admission of lubricant under pressure to the running surfaces of the idler. The reverse gear 64 is in constant mesh with the driving gear 16 which is splined to the driving shaft 1, and the reverse gear 66 is adapted to mesh with the selector gear 29 upon movement of the latter from its first position, in which it is shown in Fig. 1, to its extreme forward position which will be referred to hereinbelow as a third position of the selector gear. Before the reverse speed drive is established the clutch collar 58 is moved into the position in which it is shown in Fig. 1, and in which position it engages neither the gear 53 nor the gear 31. The gear 14 on the driving shaft 1 remains in its second position in which it is shown in Fig. 1, when the selector gear 29 is moved to its third position in order to establish the reverse speed drive.

It will be noted that the reverse idler 64, 66 is not subject to excessively high circumferential velocities when the driven shaft 2 is rotated at high speed through the high speed driving connection 17, 53, 58. The gear ratio 16, 64 is smaller than the gear ratio 17, 53, and the reverse idler will therefore be rotated at a relatively low speed as compared with the speed of the driven shaft 2, while the vehicle is operated at a high speed forward, say thirty-five miles per hour. The pitch diameter of the reverse gear 66 is much smaller than the pitch diameter of the selector gear 29, and establishment of the reverse speed drive affords a relatively low speed, say up to eight miles per hour, which is desirable for reverse drive.

For the purposes of definition the clutch collar 58 may be referred to as a control element which is non-rotatably connected with the driven shaft 2 for adjustment longitudinally thereof into neutral, high and low speed positions, the neutral position being the one in which the clutch collar is shown in Fig. 1, the high speed position being the extreme rearward position to which the clutch collar is moved in order to fully engage the clutch teeth 59, 61; and the low speed position being the extreme forward position to which the clutch collar is moved in order to fully engage the clutch teeth 62, 63. The driving gear 14 forms part of selectively operable means to establish a low speed (creeper speed) driving connection between the driving and driven shafts through the selector gear 29 while the latter is in its first position and while the control element is in its neutral position. The reverse idler 64, 66 forms part of means operable by movement of the selector gear into its third position, while the control element is in its neutral position, to establish a reverse driving connection between the driving and driven shafts through the selector gear. The cam and race members 32' and 37 constitute driving and driven members, respectively, of an overrunning clutch coaxial with and rotatable relative to the driven shaft 2.

The mechanism for shifting the gears 14 and 29 and the clutch collar 58 is constructed as follows: Three shift rods 69, 71, and 72 are slidably mounted in the upper part of the housing 3 as shown in Figs. 2, 5 and 6. Rigidly secured to the shift rod 69 is a fork 73 the pronged end of which embraces the hub of the gear 14, a groove for the reception of the prongs of the fork 73 being turned into the hub of gear 14 in conformity with the usual practice. Another fork 74 is rigidly secured to the shift rod 71 and embraces the hub of the selector gear 29, the hub of the selector gear having a circumferential groove for the reception of the prongs of the fork 74. The shift rod 72 has rigidly secured thereto an arm 76 which has an arcuate end portion projecting into a circumferential groove between the clutch teeth 59 and 62 of the clutch collar 58. Rigidly secured to the forward ends of the shift rods 69, 71 and 72, outside of the housing 3, are three shift rod extensions 77, 78 and 79, respectively, the forward ends of the extensions 77 and 79 being located at opposite sides of the forward end of the extension 78, and in relatively close proximity thereto, as shown in Fig. 5. The shift rod extensions 77, 78, 79 have notches 81, 82 and 83, respectively, adapted to receive the rounded end portion of a shift lever 84 which is universally mounted at 86 on a suitable support 87 which is rigidly connected with the housing 3. The shift lever 84 has an upwardly curved handle rod 88 which may be manipulated to swing the shift lever about its center of pivotal movement at 86.

As shown in Fig. 6, the rear end of the shift rod 72 has two notches 89, 91 for cooperation with a spring pressed plunger 90, and the shift rods 69 and 71 have notches 92, 93, respectively, for cooperation with similar spring pressed plungers, not shown. An expandable interlock plunger 94 is interposed between the shift rods 69 and 71, and a similar expandable interlock plunger 96 is shown between the shift rods 71 and 72. In the position of the shift mechanism as shown in Figs. 5 and 6, the interlock plunger 96 is compressed to its limit, and one end thereof is seated in a notch of the shift rod 72 while its other end bears against the shift rod 71. It will be seen that the shift rod 72 cannot be moved from the position in which it is shown in Figs. 5 and 6, while the interlock plunger 96 is compressed to its limit, and it will further be noted from Fig. 6 that in the mentioned position of the shift rod 72 the plunger 90 bears upon a portion of the shift rod 72 between the notches 89 and 91. The arm 76 is secured to the shift rod 72 in such a position that the clutch collar 58 occupies its neutral position in which it is shown in Fig. 1, when the shift rod is in the locked position shown in Figs. 5 and 6.

In the position of the mechanism shown in Fig. 5, the interlock plunger 94, on the other hand, is expanded, and its opposite ends are seated in registering notches of the shift rods 69 and 71. These rods are therefore not positively locked like the rod 72, but are yieldingly locked against axial movement out of the positions in which they are shown in Fig. 5. The fork 73 is secured to the shift rod 69 in such a position that the driving gear 14 occupies its second position in which it is shown in Fig. 1 when the shift rod 69 is in the yieldingly locked position shown in Fig. 5; and the fork 74 is secured to the shift rod 71 in such a position that the selector gear 29 occupies its first position in which it is shown in Fig. 1 when the shift rod 71 is in the yieldingly locked position shown in Fig. 5. In other words, the position of the shift mechanism shown in Fig. 5 corresponds to a neutral position of the transmission in which the driving shaft 1 may be rotated without transmitting any movement to the driven shaft 2. It will also be noted that in the neutral position of the shift mechanism, as shown in Figs. 5 and 6, the notches 81 and 82 of the shift rod extensions 77, 78 register with each other, and that the notch 83 of the shift rod extension 78 is positioned somewhat to the rear of the registering notches 81, 82.

The lower end of the shift lever 84 projects into the notch 82 when the shift mechanism and transmission are in neutral, and a suitable spring, not shown, urges the lower end of the shift lever against the shift rod extension 79. However, since the notch 83 is rearwardly displaced relative to the notch 82, the shift lever remains in the notch 82, and the corresponding position of its upper end is indicated in the diagram of Fig. 7 by the word Neutral.

In order to establish the creeper speed drive the shift lever is swung sidewise from its neutral position so as to move its lower end out of the notch 82 and into the notch 81, and the handle end of the rod 88 is then swung rearwardly which causes forward sliding movement of the shift rod 69. As a result, the drive gear 14 is moved from its second position into its first position, while the selector gear 29 is in its first position and while the clutch collar 58 is in its neutral position. This operation establishes the creeper speed drive. When the shift rod 69 arrives in the position corresponding to full mesh of the gears 14 and 29 a spring pressed plunger, not shown, enters into the recess 92 to retain the shift rod 69 in its drive establishing position. It will be noted that the interlock plunger 94 becomes solid upon the mentioned movement of the shift rod 69, with the result that the shift rod 71 becomes positively locked in the position in which it is shown in Fig. 5.

In order to establish the reverse speed drive the handle rod 88 is moved straight back from its neutral position as shown in Fig. 7. Such movement of the handle rod results in forward movement of the shift rod 71 from the position in which it is shown in Fig. 5, while the shift rods 69 and 72 remain in the positions in which they are shown in that figure. The mentioned forward movement of the shift rod 71 brings the selector gear 29 from its first to its third position while the gear 14 remains in its second position and while the clutch collar 58 remains in its neutral position. This operation establishes the reverse speed drive, the selector gear 29 being then in mesh with the reverse gear 66. It will be noted that the interlock plunger 94 becomes solid upon the mentioned forward movement of the shift rod 71, and as a result the shift rod 69 becomes positively locked. When the shift rod 71 arrives in the position in which the selector gear 29 is fully meshed with the reverse gear 66, a spring pressed plunger, not shown, enters into the notch 93 of the shift rod 71 to retain it in its drive establishing position.

In order to establish the high speed drive the handle rod 88 is first moved straight forward a short distance from its neutral position, then sidewise, and finally another short distance in forward direction, as indicated in Fig. 7. The first part of this movement of the handle rod affects only the shift rod 71 and causes clutching engagement of the selector gear 29 with the race member 37; it also brings the notch 82 of the shift rod extension 78 into alignment with the notch 83 of the shift rod extension 79. When the shift rod 71 arrives in the position in which the teeth 52 of the selector gear are fully engaged with the teeth 51 of the race member 37, and in which position the notch 82 registers with the notch 83, a notch 97 of the shift rod 71 registers with the interlock plunger 96 permitting the latter to expand. As a result, the shift rod 71 becomes locked in its rearwardly shifted position, and the interlock plunger 96 does no longer act as a positive lock for the shift rod 72.

When the notches 82 and 83 of the shift rod extensions 78, 79 register, the handle rod 88 is swung sidewise, as indicated in Fig. 7, to move the lower end of the shift lever 84 out of the notch 82 and into the notch 83. The subsequent forward movement of the handle rod 88 then affects only the shift rod 72, and causes engagement of the clutch teeth 59 with the clutch teeth 61 by rearward movement of the clutch collar 58. This operation establishes the high speed drive. When the shift rod 72 arrives in the position corresponding to full engagement of the clutch teeth 59 with the clutch teeth 61 the spring pressed plunger 90 drops into the notch 89 (Fig. 6) to retain the shift rod 72 in its drive establishing position.

As has been pointed out hereinbefore, the entire driving power is transmitted from the shaft 1 to the shaft 2 through the gears 17, 53 and clutch collar 58 when the high speed drive is established, and the selector gear 29 and race 37 which have been clutched together by the initial straight forward movement of the handle rod 88 from its neutral position, rotate idly in unison with the driven shaft upon establishment of the high speed drive. However, the construction of the shift mechanism which makes it necessary to clutch the selector gear 29 to the race member 37 before the high speed drive can be established affords the advantage that the low speed drive can readily be established without moving the handle rod 88 to its neutral position, after the high speed drive has been established.

As shown in Fig. 7, the low speed position of the handle rod 88 is directly in line with its high speed position, and all the operator has to do, in order to change from high to low, is to pull the handle rod 88 to the rear from its high speed position. Such movement of the handle rod causes forward movement of the shift rod 72 while the interlock plunger 96 remains in engagement with the notch 97 of the shift rod 71 and the selector gear 29 therefore remains clutched to the race member 37. Movement of the handle rod 88 from its high speed position to the point C in Fig. 7 causes disengagement of the clutch teeth 59 from the clutch teeth 61, and without any further rearward movement of the handle rod 88 driving power may then be transmitted from the driving shaft 1 to the driven shaft 2 through the intermeshing gears 16, 31, cam member 32', rollers 38, race member 37, clutch teeth 51, 52 and hub of selector gear 29. Movement of the handle rod 88 from point C in Fig. 7 to its final low speed position causes engagement of the clutch teeth 62 with the clutch teeth 63, and establishes the locking connection between the driven shaft 2 and the gear 31. Accordingly, when the handle rod 88 is in its final low speed position the braking power of the engine will be available to retard the vehicle when descending a hill in low gear, as has been pointed out hereinbefore.

When the shift rod 72 arrives in the position corresponding to full engagement of the clutch teeth 62 with the clutch teeth 63 the plunger 90 drops into the notch 91 of the shift rod 72 and retains the shift rod 72 in the position corresponding to the final low speed position of the handle rod 88 indicated in Fig. 7.

While in the foregoing a preferred embodiment of the invention has been disclosed it should be understood that it is not intended to limit the invention to the exact details of construction herein shown and described for various modifications within the scope of the appended claims may occur to persons skilled in the art.

It is claimed and desired to secure by Letters Patent:

1. In a change speed transmission, rotatable driving and driven shafts, a control element non-rotatably connected with said driven shaft for adjustment longitudinally thereof into neutral, high and low speed positions, means engageable by movement of said control element into its high speed position to establish a driving connection between said shafts affording a speed of rotation of said driven shaft higher than that of said driving shaft, a selector gear non-rotatably connected with said driven shaft for adjustment axially thereof into first, second, and third positions, means selectively operable to establish a low speed driving connection between said shafts through said selector gear while the latter is in its first position and while said control element is in its neutral position, means for establishing another low speed driving connection between said shafts affording a speed of rotation of said driven shaft lower than that of said driving shaft, said last named means comprising a cam member coaxial with and rotatable relative to said driven shaft, permanently meshing gearing connecting said cam member with said driving shaft, a race member, rollers co-operating with said cam and race members to afford a one-way driving connection therebetween, clutch means adapted to connect said race member with said selector gear by movement of the latter into its second position, and clutch means adapted to connect said cam member with said control element by movement of the latter into its low speed position; and means operable by movement of said selector gear into its third position while said control element is in its neutral position, to establish a reverse driving connection between said shafts through said selector gear.

2. In a change speed transmission, rotatable driving and driven shafts, a control element non-rotatably connected with said driven shaft for adjustment longitudinally thereof into neutral, high and low speed positions, means engageable by movement of said control element into its high speed position to establish a driving connection between said shafts affording a speed of rotation of said driven shaft higher than that of said driving shaft, a selector gear non-rotatably connected with said driven shaft for adjustment axially thereof into first and second positions, means selectively operable to establish a driving connection between said shafts through said selector gear while the latter is in its first position and while said control element is in its neutral position, and means for establishing a low speed driving connection between said shafts affording a speed of rotation of said driven shaft lower than that of said driving shaft, said last named means comprising a cam member coaxial with and rotatable relative to said driven shaft, permanently meshing gearing connecting said cam member with said driving shaft, a race member, rollers cooperating with said cam and race members to afford a one-way driving connection therebetween, clutch means adapted to connect said race member with said selector gear by movement of the latter into its second position, and clutch means adapted to connect said cam member with said control element by movement of the latter into its low speed position.

3. In a change speed transmission, rotatable driving and driven shafts, a control element coaxial with and shiftable longitudinally of said driven shaft into high and low speed positions, means engageable by movement of said control element into its high speed position to establish a high speed driving connection between said shafts affording a speed of rotation of said driven shaft higher than that of said driving shaft, a low speed driving connection between said shafts affording a speed of rotation of said driven shaft lower than that of said driving shaft, said low speed driving connection comprising a cam member coaxial with and rotatable relative to said driven shaft, permanently meshing gearing connecting said cam member with said driving shaft, a race member, selectively engageable and disengageable connecting means between said race member and said driven shaft, rollers cooperating with said cam and race members to afford a one-way driving connection between said cam member and said driven shaft, and clutch means operable by movement of said control element into its low speed position to establish a locking connection between said cam member and said driven shaft.

4. In a change speed transmission, rotatable driving and driven shafts, a control element coaxial with and shiftable longitudinally of said driven shaft into high and low speed positions, means engageable by movement of said control element into its high speed position to establish a high speed driving connection between said shafts affording a speed of rotation of said driven shaft higher than that of said driving shaft, a low speed driving connection between said shafts affording a speed of rotation of said driven shaft lower than that of said driving shaft, said low speed driving connection comprising a cam member coaxial with and rotatable relative to said driven shaft, permanently meshing gearing connecting said cam member with said driving shaft, a race member, connecting means between said race member and said driven shaft, rollers cooperating with said cam and race members to afford a one-way driving connection between said cam member and said driven shaft, and clutch means operable by movement of said control member into its low speed position to establish a locking connection between said cam member and said driven shaft.

5. In a change speed transmission, a driving shaft and a driven shaft rotatable, respectively, on relatively spaced axes, a control element coaxial with and shiftable longitudinally of said driven shaft into high and low speed positions, means engageable by movement of said control element into its high speed position to establish a driving connection between said shafts affording a speed of rotation of said driven shaft higher than that of said driving shaft, means for transmitting rotation of said driving shaft to said driven shaft at a speed ratio lower than that of said driving connection, said last named means comprising a cam member coaxial with and rotatable relative to said driven shaft, permanently meshing gearing connecting said cam member with said driving shaft, a race member, connecting means between said race member and said driven shaft, rollers cooperating with said cam and race members to afford a one-way driving connection between said cam member and said driven shaft, and clutch means operable by movement of said control element into its low speed position to establish a locking connection between said cam member and said driven shaft.

6. In a change speed transmission, rotatable driving and driven shafts, a control element coaxial with and shiftable longitudinally of said driven shaft into high and low speed positions, means engageable by movement of said control element into its high speed position to establish a driving connection between said shafts affording a speed of rotation of said driven shaft higher than that of said driving shaft, means for transmitting rotation of said driving shaft to said driven shaft at a speed ratio lower than that of said driving connection, said last named means comprising, a rotary element coaxial with and rotatable relative to said driven shaft, permanently meshing gearing connecting said rotary element with said driving shaft, means cooperating with said rotary element and with said driven shaft to afford a one-way driving connection therebetween independently of said permanently meshing gearing and control element, and clutch means operable by movement of said control element into its low speed position to establish a locking connection between said rotary element and said driven shaft.

7. In a change speed transmission, rotatable intake and output shafts arranged in transversely spaced parallel relation to each other, a pair of alternately operable driving connections between said shafts, one of said driving connections being adapted to transmit rotation of said intake shaft to said output shaft at a higher speed ratio than the other and comprising an axially shiftable and an axially fixed torque transmitting member of a first clutch mounted on one of said shafts, and said other driving connection comprising, driving and driven members of an overrunning clutch coaxial with and rotatable relative to said output shaft, permanently meshing gearing connecting said driving clutch member with said intake shaft, an axially shiftable member of a second clutch connected independently of said axially shiftable torque transmitting member of said first clutch in non-rotatable relation with said output shaft and operable to establish and interrupt a driving connection between said driven member of said overrunning clutch and said output shaft, and an axially shiftable and an axially fixed member of a lock-up clutch connected, respectively, with said axially shiftable torque transmitting member of said first clutch and with said driving member of said overrunning clutch.

8. In a change speed transmission, driving and driven shafts rotatable, respectively, about relatively spaced parallel axes, a selector gear non-rotatably connected with said driven shaft for adjustment longitudinally thereof into first, second and third positions, means selectively operable to establish a first driving connection between said shafts through said selector gear while the latter is in its first position, means operable by movement of said selector gear into its second position to establish a second driving connection between said shafts affording a speed of rotation of said driven shaft lower than that of said driving shaft, a selectively operable driving connection between said shafts affording a speed of rotation of said driven shaft higher than that of said driving shaft, a reverse idler rotatable about an axis spaced from the axes of said shafts and adapted to mesh with said selector gear upon movement of the latter into its third position, and a permanent driving connection between said reverse idler and said driving shaft including a driving gear non-rotatably secured to said driving shaft; said second driving connection comprising a cam member coaxial with and rotatable relative to said driven shaft, permanently meshing gearing connecting said cam member with said driving gear, a race member, rollers cooperating with said cam and race members to afford a one-way driving connection therebetween, and clutch means operable by movement of said selector gear into its second position to connect said race member with said driven shaft.

9. In a change speed transmission, rotatable driving and driven shafts, a selector gear non-rotatably connected with said driven shaft for adjustment longitudinally thereof into first, second and third positions, means selectively operable to establish a first driving connection between said shafts through said selector gear while the latter is in its first position, means operable by movement of said selector gear into its second position to establish a second driving connection between said shafts affording a speed of rotation of said driven shaft lower than that of said driving shaft, a selectively operable driving connection between said shafts affording a speed of rotation of said driven shaft higher than that of said driving shaft, and means operable by movement of said selector gear into its third position to establish another driving connection between said shafts through said selector gear; said second driving connection comprising a cam member coaxial with and rotatable relative to said driven shaft, permanently meshing gearing connecting said cam member with said driving shaft, a race member, rollers cooperating with said cam and race members to afford a one-way driving connection therebetween, and clutch means adapted to connect said race member with said selector gear by movement of the latter into its second position.

10. In a change speed transmission, rotatable driving and driven shafts, a selector gear non-rotatably connected with said driven shaft for adjustment longitudinally thereof into first, second and third positions, means selectively operable to establish a first driving connection between said shafts through said selector gear while the latter is in its first position, means operable by movement of said selector gear into its second position to establish a second driving connection between said shafts affording a speed of rotation of said driven shaft lower than that of said driving shaft, a selectively operable driving connection between said shafts affording a speed of rotation of said driven shaft higher than that of said driving shaft, and means operable by movement of said selector gear into its third position to establish another driving connection between said shafts through said selector gear, said second driving connection comprising driving and driven members of an overrunning clutch coaxial with and rotatable relative to said driven shaft, permanently meshing gearing connecting said driving clutch member with said driving shaft, and clutch means operable by movement of said selector gear into its second position to connect said driven clutch member with said driven shaft.

11. In a change speed transmission, a pair of shafts rotatable, respectively, about relatively spaced parallel axes, a drive gear non-rotatably connected with one of said shafts for adjustment axially thereof, a selector gear non-rotatably connected with the other of said shafts for adjustment axially thereof and adapted to mesh with said drive gear, shift means operable to move said gears from first predetermined positions thereof in which they are in mesh with each other in one direction to second predetermined positions, respectively, and to move said selector gear from said first predetermined position thereof in the opposite direction to a third predetermined position, the spacing between said first and second positions of said drive gear being greater than the spacing between said first and second positions of said selector gear so that said gears when adjusted to their second positions are out of mesh with each other, means for establishing a driving connection between said shafts by movement of said selector gear from its first to its second position while said drive gear is in its second position, and means for establishing another driving connection between said shafts by movement of said selector gear from its first to its third position.

12. In a change speed transmission, a pair of shafts rotatable, respectively, about relatively spaced parallel axes, a drive gear non-rotatably connected with one of said shafts for adjustment longitudinally thereof into first and second positions, a selector gear non-rotatably connected with the other of said shafts for adjustment longitudinally thereof into first, second and third positions, said drive and selector gears, when adjusted to their first positions, being adapted to mesh with each other and being out of mesh with each other, in any of said positions of said selector gear, while said drive gear is in its second position, and means operable by movement of said selector gear into said second and third positions for selectively establishing driving connections between said shafts while said drive gear is in its second position.

13. In a change speed transmission, driving and driven shafts rotatable, respectively, about relatively spaced parallel axes, an overrunning clutch comprising a driving and a driven clutch member coaxial with and rotatable relative to said driven shaft, a permanent driving connection between said driving shaft and said driving clutch member, including a drive gear non-rotatably connected with said driving shaft, a selector gear non-rotatably connected with said driven shaft for adjustment longitudinally thereof, said selector gear having a portion adapted to engage said driven clutch member upon movement of said selector longitudinally of said driven shaft to establish a forward driving connection between said shafts, and a reverse idler rotatable about an axis spaced from the axes of said shafts, said reverse idler having a gear portion in constant mesh with said drive gear and another gear portion adapted to mesh with said selector gear upon movement of the latter to a reverse drive establishing position in which said selector gear is out of engagement with said driven clutch member.

14. In a change speed transmission, driving and driven shafts rotatable about relatively spaced parallel axes, a drive gear non-rotatably connected with said driving shaft for adjustment longitudinally thereof, a selector gear non-rotatably connected with said driven shaft for adjustment longitudinally thereof and adapted to mesh with said drive gear, shift means operable to move said gears from first predetermined positions thereof, in which they are in mesh with each other, in one direction to second predetermined positions, respectively, and to move said selector gear from said first predetermined position thereof in the opposite direction to a third predetermined position while said drive gear is in its second predetermined position, the spacing between said first and second positions of said drive gear being greater than the spacing between said first and second positions of said selector gear so that said gears, when adjusted to their second positions, are out of mesh with each other; a rotary element coaxial with and rotatable relative to said driven shaft, means including permanently meshing gearing connecting said rotary element with said driving shaft, clutch means operable by movement of said selector gear into its second position to drivingly connect said rotary element with said driven shaft, and reverse gearing connected in permanently driven relation with said driving shaft and including a nonshiftable gear element adapted to mesh with said selector gear upon adjustment of the latter to said third predetermined position thereof.

15. In a transmission of the character described, a driving shaft, a driven shaft arranged in spaced parallel relation to the driving shaft, two gears secured to the driving shaft, a high speed gear journaled on the driven shaft in mesh with one of said gears on the driving shaft, a low speed gear mounted on the driven shaft in mesh with the other of said gears on the driving shaft, shiftable clutch means on the driven shaft for releasably connecting either said high speed gear or said low speed gear with the driven shaft, overrunning clutch means on the driven shaft having one element secured to said low speed gear, and other shiftable clutch means on the driven shaft for releasably connecting the other element of the overrunning clutch means with the driven shaft.

16. In a change speed transmission, a driving shaft and a driven shaft rotatable, respectively, about relatively spaced axes, a shiftable driving gear nonrotatably secured to said driving shaft for adjustment axially thereof, a selector gear adapted to mesh with said shiftable driving gear and nonrotatably secured to said driven shaft for adjustment axially thereof, a nonshiftable driven gear rotatably mounted coaxially with said driven shaft and permanently geared to said driving shaft, overrunning clutch means comprising a driving member connected with said nonshiftable driven gear and a driven member in rotatable relation to said driven shaft, relatively engageable and disengageable clutch means associated, respectively with said selector gear and with said driven member of said overrunning clutch, means for moving said shiftable driving gear into and out of mesh with said selector gear while the latter is out of clutching engagement with said driven member of said overrunning clutch, and means selectively operable to establish and interrupt another driving connection between said shafts through said selector gear while the latter is out of mesh with said shiftable driving gear and out of clutching engagement with said driven member of said overrunning clutch, said last named means comprising a nonshiftable idler gear rotatable about an axis spaced from the axes of said driving and driven shafts and having a gear section adapted to mesh with said selector gear.

WILLIAM F. WILSON.

(References on following page)

REFERENCES CITED

The following references are of record in the file of this patent:

UNITED STATES PATENTS

| Number | Name | Date |
|---|---|---|
| 1,233,877 | Henderson | July 17, 1917 |
| 1,969,289 | Ackerman | Aug. 7, 1934 |
| 2,018,032 | Raven | Oct. 22, 1935 |
| 2,056,365 | Raven | Oct. 6, 1936 |
| 2,097,569 | Kilpela | Nov. 2, 1937 |
| 2,113,088 | Jonsson | Apr. 5, 1938 |
| 2,118,853 | Meech | May 31, 1938 |
| 2,156,336 | Haigh | May 2, 1939 |
| 2,311,201 | Backus | Feb. 16, 1943 |
| 2,343,312 | Maurer | Mar. 7, 1944 |